April 2, 1968                        J. LUND                        3,376,497

INPUT FILTER FOR TRANSISTOR VOLTAGE REGULATORS

Filed Sept. 15, 1965

INVENTOR.

Johan Lund

BY C. R. Meland

HIS ATTORNEY

United States Patent Office 3,376,497
Patented Apr. 2, 1968

3,376,497
INPUT FILTER FOR TRANSISTOR VOLTAGE REGULATORS
Johan Lund, Kokomo, Ind., assignor to General Motors Corporation, Detroit, Mich., a corporation of Delaware
Filed Sept. 15, 1965, Ser. No. 487,501
5 Claims. (Cl. 322—28)

ABSTRACT OF THE DISCLOSURE

This invention relates to a transistor voltage regulator for regulating the output voltage of a diode rectified alternating current generator. The regulator has an R-C filter network for reducing the sensitivity of the regulator to high frequency ringing components developed by the diodes of the rectifier. This R-C filter network is the resistance of a voltage divider and the junction capacitance of semiconductor elements utilized in the regulator.

---

This invention relates to transistor voltage regulators for regulating the output voltage of a generator having a field winding and more particularly to an improved input filter for transistor voltage regulators that may be fabricated by integrated circuit techniques.

It is known in the art to provide a transistor voltage regulator for controlling the output voltage of an alternating current generator that feeds an electrical load through a rectifying means. This type of system is illustrated in the patent to Short, Re. 24,715.

One of the objects of this invention is to provide a transistor voltage regulator for regulating the output voltage of a diode-rectified alternator that has an improved input filter arrangement that is well adapted to be used where the voltage regulator is fabricated by an integrated circuit technique such as by the use of one or more monolithic silicon blocks.

Another object of this invention is to provide an improved input filter for a transistor voltage regulator that utilizes a resistance-capacitance circuit where the capacitance is obtained from the junction capacitance of a Zener diode which is also utilized to determine the point at which the regulator switches to control the current flow in the field of a generator.

Another object of this invention is to provide a transistor regulator which is comprised of two switching circuits each of which include a pair of transistors having common collector connections and wherein the transistor regulator utilizes an improved input filter that prevents the system from being switched by high frequency diode ringing oscillations and by the ripple produced where the output of an alternating current generator is rectified by a rectifying circuit. In carrying this object forward, an RC filter circuit is provided which uses the effective capacitance of the combination of a Zener diode in series with two forward biased diodes which are the base-emitter diodes of two transistors and a resistance. The RC time constant of these time components is such that is comparable to the period of the diode ringing frequency.

Further objects and advantages of the present invention will be apparent from the following description, reference being had to the accompanying drawings wherein preferred embodiments of the present invention are clearly shown.

Figure 1:
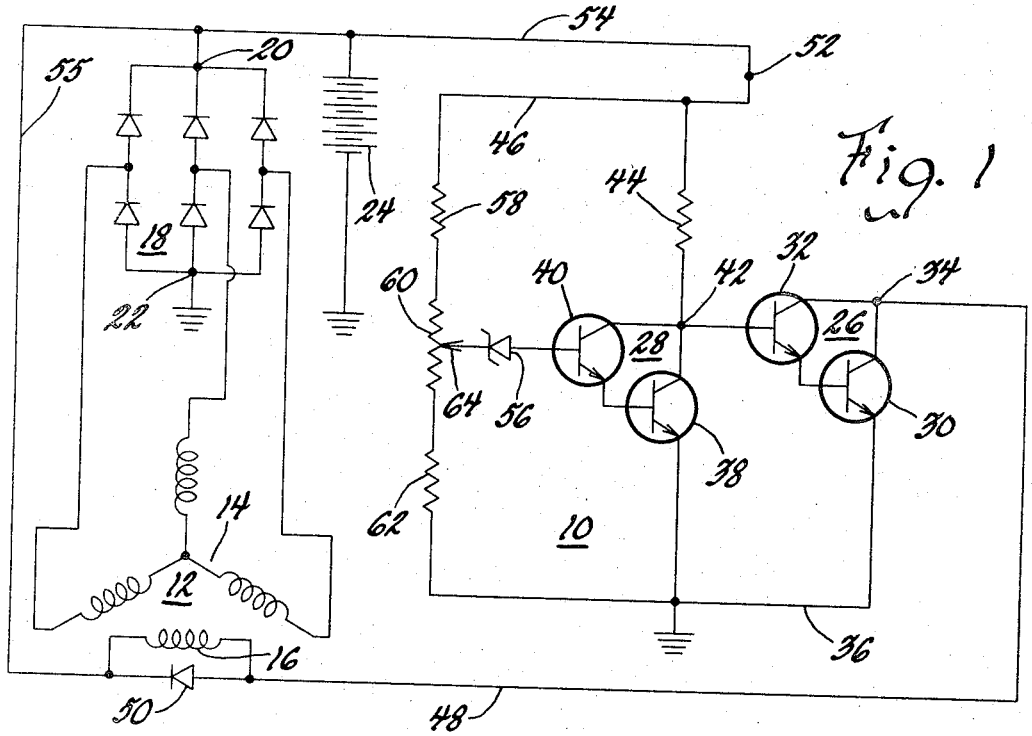
FIGURE 1 is a schematic circuit diagram illustrating a transistor voltage regulator made in accordance with this invention and utilizes an improved input filter made in accordance with this invention.

Referring now to the drawings and more particularly to FIGURE 1, the reference numeral 10 designates a transistor voltage regulator which is utilized to regulate the output voltage of a generator designated by a reference numeral 12. Although the generator can take various forms, it is illustrated in the drawing as an alternating current generator having a three phase Y-connected output winding 14 and a field winding 16. The output winding 14 is connected with the AC input terminals of a three phase full-wave bridge rectifier generally designated by reference numeral 18 and preferably comprised of six silicon diodes. The bridge rectifier 18 has a positive DC output terminal 20 and a negative grounded DC output terminal 22.

The direct current output terminals of the bridge rectifier 18 are used to feed various direct current loads and on a motor vehicle, the bridge rectifier supplies charging current to a battery 24 and other motor vehicle loads.

The transistor voltage regulator 10 controls the current flow through the field winding 16 of the generator 12 to regulate the output voltage of the generator 12. Thus in a motor vehicle system, the generator is driven by the engine of the motor vehicle and therefore is driven through a widely varying speed range. In addition, the load on the generator varies depending upon the number of direct current loads that are energized and the regulator of this invention maintains the output voltage of the generator 12 substantially constant through a varying engine speed range and a varying load range.

The transistor regulator 10 utilizes two transistor switching circuits 26 and 28 which are each formed of a pair of transistors having common collector connections. The first switching circuit 26 is comprised of NPN transistors 30 and 32 with the collectors of these transistors being connected together and to a field terminal 34 of the regulator. The emitter of transistor 32 is connected with the base of transistor 30 and the emitter of transistor 30 is connected with a grounded conductor 36. The switching circuit 26 therefore has a base terminal, an emitter terminal and a collector terminal.

The switching circuit 28 like the switching circuit 26 includes two NPN transistors 38 and 40 having their collector electrodes connected together and to a junction 42. The junction 42 forms a collector terminal which is connected to the base of transistor 32 and to one side of a resistor 44. The opposite side of the resistor 44 is connected with a conductor 46. The emitter of transistor 40 is connected with the base of transistor 38 and the emitter of transistor 38 is connected to grounded conductor 36. The switching circuit 28 therefore has a base terminal which is the base of transistor 40, a collector terminal which is junction 42 and an emitter terminal which is connected to conductor 36. The collector terminal of the switching circuit 28 is connected with the base terminal of switching circuit 26.

The collector terminal of the switching circuit 26 is connected with field terminal 34 and to one side of the field winding 16 by a conductor 48. A field discharge diode 50 is connected across the field winding 16 and this circuit is external of the regulator.

The conductor 36 is grounded and is therefore connected to the negative side of the bridge rectifier 18. The conductor 46 is connected with a regulator terminal 52 and this terminal is connected to the positive side of the bridge rectifier 18 by a conductor 54.

The voltage responsive circuit for causing a switching of the two switching circuits 26 and 28 includes a PN junction known in the art as a Zener diode 56 and a voltage divider comprised of resistors 58, 60 and 62. The resistor 60 is a potentiometer and has a shiftable tap 64 connected to one side of Zener diode 56. The opposite side of Zener diode 56 is connected to the base terminal of transistor 40 and therefore with the base terminal of the second switching circuit 28.

In the system of FIGURE 1, when the output voltage of the generator is below the desired regulated voltage, the Zener diode 56 will be nonconducting in a reverse direction with the result that the junction 42 will be at substantially the same potential as conductor 46. Since the emitter of transistor 30 is at a negative potential, the transistors 30 and 32 will be biased to a conductive condition and the field 16 will be energized from direct current output terminal 20, conductor 55, field 16, conductor 48, junction 34, and then through the collector-emitter circuit of transistor 30 to grounded conductor 36.

Since the field is now energized, the output voltage of the generator will increase and when the output voltage goes above the desired regulated value, the Zener diode 56 will break down in a reverse direction to supply base-emitter current to transistors 40 and 38. This biases the transistor 38 to a conductive condition and as a result of this, current will flow through resistor 44 and the junction 42 will now have a potential which is substantially equal to the potential of grounded conductor 36. Because of this, the transistors 30 and 32 will now be biased to a nonconductive condition and current flow through the field winding 16 is reduced. This, of course, reduces the output voltage of the generator and by the switching of transistor 30 on and off, the output voltage of the generator is maintained substantially constant through a varying speed and load range.

The output voltage of bridge rectifier 18 has a ripple component which is applied to the voltage regulator circuit and to the Zener diode 56. The frequency of this ripple is a function of the speed at which the alternator is driven. In addition to the alternator ripple which is applied to the zener diode 56, there is a diode ringing component superimposed on the alternator ripple which is also applied to the Zener diode 56 and results from the junction capacitance of the diodes of the bridge rectifier 18.

It is desirable to attenuate or filter the combined alternator ripple and diode ringing voltage which is applied to the Zener diode 56. In the circuit of FIGURE 1, this is accomplished by providing an RC network that has an RC time constant comparable to the period of the diode ringing frequency. The resistor portion of this RC network is provided by resistor 58 and the portion of resistor 60 connected between tap 64 and resistor 58. The capacitance of the RC network is provided by the junction capacitance of the Zener diode 56 and the capacitance of the two series forward biased diodes which are the base-emitter diodes of transistors 38 and 40. It is desirable to use the junction capacitance of the Zener diode 56 in series with the two forward biased diodes, which are the base-emitter diodes of transistors 38 and 40 as a part of the RC network where the circuit is to be fabricated by integrated circuit techniques. In this RC network, the combined resistance of resistor 58 and a part of resistor 60 is made high enough so that the capacitance of the Zener diode 56 in series with two forward biased diodes, which are the base-emitter diodes of transistors 38 and 40, will be sufficient to provide the proper RC time constant. In this regard, the resistor 58 and a part of resistor 60 can have a resistance value of approximately 100K ohms.

Figure 2:
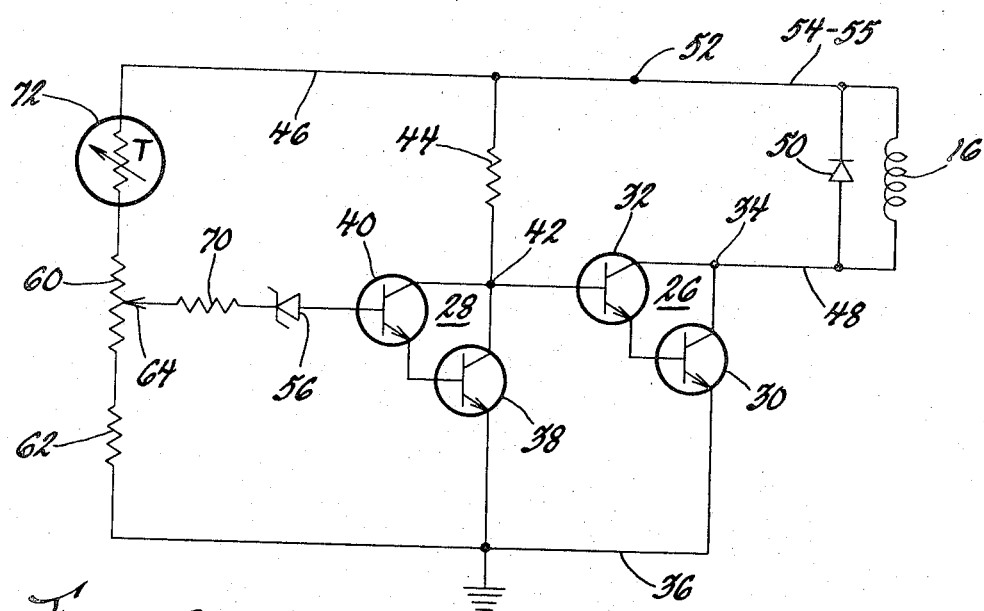
FIGURE 2 illustrates a modified transistor voltage regulator having a modified input filter made in accordance with this invention.

Referring now to FIGURE 2, a modified voltage regulator made in accordance with this invention is illustrated.

In FIGURE 2, the same reference numerals have been used as were used in FIGURE 1 to identify the same circuit components in each figure. FIGURE 2 does not illustrate the output winding of the alternator or the bridge rectifier but it is to be understood that the voltage regulator of FIGURE 2 will be connected with the generator in the same manner as the voltage regulator in FIGURE 1.

The FIGURE 2 voltage regulator differs from the voltage regulator shown in FIGURE 1 in that a resistor 70 is connected between Zener diode 56 and the tap 64 on potentiometer resistor 60. In addition, the resistor 58 is replaced by a thermistor 72 having a negative temperature coefficient of resistance. The resistance of the thermistor 72 although variable, can be approximately 1.45K ohms and the resistance of resistor 70 will be approximately 100K ohms.

The addition of the resistor 70 improves the filter or attenuating action of the voltage regulator by increasing the RC time constant. The addition of this resistor also reduces the available base current to the transistor switching circuit 28 but sufficient gain is available in the circuit due to the pairs of switching circuits 26 and 28.

In the embodiment of FIGURE 2, the capacitance of the Zener diode 56 in series with two forward biased diodes, which are the base-emitter diodes of transistors 38 and 40, and the resistance of the circuit connecting the Zener diode and conductor 46 is used as the RC circuit for attenuating or filtering the alternator ripple and the diode ringing component. By connecting the resistor 70 having a relatively high resistance between tap 64 and Zener diode 56, it is possible to reduce the resistance of the voltage divider connected across conductors 46 and 36 as compared to the resistance of the same voltage divider in FIGURE 1. The FIGURE 2 voltage regulator operates in the same manner as that shown in FIGURE 1 in that the transistor 30 is switched on and off to control the current flow in the field winding 16 and therefore the output voltage of the generator. In FIGURE 2, the RC network that has been described prevents the regulator from being triggered by the alternator ripple frequency and the diode ringing component.

While the embodiments of the present invention as herein disclosed constitute preferred forms, it is to be understood that other forms might be adopted.

What is claimed is as follows:

1. An electrical system comprising, an alternating current generator having an output winding and a field winding, a bridge rectifier network comprised of a plurality of diodes having AC input terminals connected with said output winding and direct current output terminals, first and second direct current output power supply conductors connected with the direct current output terminals of said bridge rectifier, a voltage regulator for maintaining the output voltage of said generator substantially constant, said voltage regulator including first and second switching circuits, said first switching circuit including at least one power output transistor, means connecting said power output transistor in series with said field winding and with said generator output winding whereby field current is controlled by said output transistor, said second switching circuit including second and third transistors and a Zener diode, means coupling said first and second switching circuits with each other and to said power supply conductors in such a manner that said first switching circuit is driven conductive when said second switching circuit is biased substantially nonconductive and vice versa, a voltage divider having a junction connected across said first and second direct current power supply conductors, means connecting said Zener diode and the base-emitter PN junctions of said second and third transistors in series between said junction of said voltage divider and said second direct current output terminal, said transistors being biased conductive when the voltage appearing between said junction of said voltage divider and said second direct current power supply conductor exceeds the voltage breakdown rating of said Zener diode and said PN junctions of said transistors, and an RC filter network for reducing the sensitivity of said Zener diode and said PN junctions of said transistors to being switched by ringing components developed by the diodes of said bridge rectifier, the resistance of said R-C network including a portion of said voltage divider connected between said first direct current output terminal and said junction of said voltage divider, said capacitance of said R-C filter network including the junction capacitance of said Zener diode and the junction capacitance of the PN junctions of said second and third transistors.

2. An electrical system comprising an alternating current generator having an output winding and a field winding, a rectifier network comprised of a plurality of diodes connected with said output winding and having direct current output terminals, first and second direct current power supply conductors connected with said direct current output terminals of said rectifier network, a voltage regulator for maintaining the output voltage of said generator substantially constant, said voltage regulator including a voltage divider connected across said direct current power supply conductors, said voltage divider including at least one resistor and having a tap located intermediate its ends, first and second NPN transistors, means connecting the emitter of said first NPN transistor with the base of said second NPN transistor, means connecting the collectors of said NPN transistors together and to a junction, a resistor connected between said first direct current power supply conductor and said junction, means connecting the emitter of said second transistor with said second direct current supply conductor, a Zener diode connected between said tap on said voltage divider and the base of said first transistor, an R-C filter network for reducing the sensitivity of said NPN transistors to being switched by ringing components developed by the diodes of said rectifier network, said R-C filter network including the resistance of said voltage divider between said first direct current output terminal and said tap on said voltage divider, the capacitance of said R-C filter network provided by the junction capacitance of said Zener diode and the junction capacitance of the base-emitter PN junctions of said NPN transistors, a switching field control means, means connecting said field winding of said generator and said field control means in series and with said output winding of said generator, and means coupling said junction and said field control means whereby said field control means is controlled by said Zener diode and said NPN transistors.

3. An electrical system comprising, an alternating current generator having an output winding and a field winding, a bridge rectifier network comprised of a plurality of diodes connected with said output winding, said bridge rectifier network having direct current output terminals connected with first and second direct current power supply conductors, a voltage regulator including a first output transistor having emitter, collector and base electrodes, means connecting said field winding and the collector and emitter electrodes of said first transistor in series and across said output winding, a voltage divider connected across said first and second power supply conductors having a first junction, a voltage responsive switching circuit connected between said first junction and said second direct current power supply conductor, said voltage responsive switching circuit including in a series connection a Zener diode and two PN junctions of second and third driver transistors, means connecting like electrodes of said second and third driver transistors together and to a second junction, a resistor connected between said first direct current power supply conductor and said second junction, means connecting said second junction to the base of said first output transistor, said first output transistor being biased conductive when said second and third driver transistors are nonconductive and vice versa, and an RC filter network for reducing the sensitivity of the voltage responsive circuit including said Zener diode and the PN junctions of said two transistors to being triggered by ringing components developed by the diodes of said bridge rectifier, the resistance of said RC filter network being provided by the resistance of said voltage divider connected between said first direct current output terminal and said first junction, the capacitance of said RC filter network being provided by the capacitance of said Zener diode and the capacitance of said two PN junctions of said second and third transistors.

4. An electrical system according to claim 1 where a part of the resistance of the RC filter network is provided by a resistor connected between said voltage divider junction and said Zener diode.

5. The electrical system according to claim 1 where the RC time constant of the filter network is substantially equal to the period of the diode ringing frequency.

References Cited

UNITED STATES PATENTS

| 3,098,192 | 7/1963 | Levy et al. | 317—33 |
| 3,121,837 | 2/1964 | Holm et al. | 322—28 |
| 3,201,681 | 8/1965 | Wilgen et al. | 323—22 |

MILTON O. HIRSHFIELD, *Primary Examiner.*

R. V. LUPO, *Assistant Examiner.*